United States Patent
Berkman

(10) Patent No.: US 7,026,917 B2
(45) Date of Patent: Apr. 11, 2006

(54) POWER LINE COMMUNICATION SYSTEM AND METHOD OF OPERATING THE SAME

(75) Inventor: William H. Berkman, New York, NY (US)

(73) Assignee: Current Technologies, LLC, Germantown, MD (US)

( * ) Notice: Subject to any disclaimer, the term of this patent is extended or adjusted under 35 U.S.C. 154(b) by 184 days.

(21) Appl. No.: 10/884,563

(22) Filed: Jul. 2, 2004

(65) Prior Publication Data

US 2005/0001693 A1 Jan. 6, 2005

Related U.S. Application Data

(60) Provisional application No. 60/484,856, filed on Jul. 3, 2003.

(51) Int. Cl.
*H04M 11/04* (2006.01)

(52) U.S. Cl. .............................. 340/310.01; 340/310.03; 375/220

(58) Field of Classification Search .............. 340/310.01–310.08; 455/402; 375/220, 222
See application file for complete search history.

(56) References Cited

U.S. PATENT DOCUMENTS 6,154,488 A * 11/2000 Hunt ........................... 375/219
2002/0109585 A1 * 8/2002 Sanderson ............. 340/310.01

* cited by examiner

*Primary Examiner*—Phung T. Nguyen
(74) *Attorney, Agent, or Firm*—Mel Barnes; Manelli Denison & Selter PLLC

(57) ABSTRACT

The present invention provides communications via multiple power lines that are communicatively coupled to each other at a coupling location, which for example may be at a substation. In one embodiment, the system may comprise a first communications device communicatively coupled to a first power line at a first location, wherein the first location is a first distance from the coupling location. A second communications device may be communicatively coupled to a second power line at a second location, wherein the second location is a second distance from the coupling location. The devices may be backhaul points, bypass devices, or other PLC network elements. The first communications device transmits data over power lines a first communications distance. The locations are selected so that sum of the first distance and second distance is greater than the first communications distance even if the first distance is less than the first communications distance.

23 Claims, 2 Drawing Sheets

US 7,026,917 B2

POWER LINE COMMUNICATION SYSTEM AND METHOD OF OPERATING THE SAME

CROSS REFERENCE TO RELATED APPLICATIONS

This application claims priority under 35 U.S.C. § 119(e) to U.S. Provisional Patent Application Ser. No. 60/484,856 filed Jul. 3, 2003, which is incorporated herein by reference in its entirety.

FIELD OF THE INVENTION

The present invention generally relates to data communications over a power distribution system and more particularly, to a system and method for communicating data, which may include video, audio, voice, and/or other data types.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines, that already have been run to many homes and offices, can be used to carry data signals to and from the homes and offices. These data signals are communicated on and off the power lines at various points in the power line communication system, such as, for example, near homes, offices, Internet service providers, and the like.

Power distribution systems include numerous sections, which transmit power at different voltages. The transition from one section to another typically is accomplished with a transformer. The sections of the power distribution system that are connected to the customers premises typically are low voltage (LV) sections having a voltage between 100 volts (V) and 240V, depending on the system. In the United States, the LV section typically is about 120V. The sections of the power distribution system that provide the power to the LV sections are referred to as the medium voltage (MV) sections. The voltage of the MV section is in the range of 1,000V to 100,000V. The transition from the MV section to the LV section of the power distribution system typically is accomplished with a distribution transformer, which converts the higher voltage of the MV section to the lower voltage of the LV section.

In a power line distribution system, up to ten (and sometimes more) customer premises typically will receive power from one distribution transformer via their respective LV power lines. These LV power lines constitute infrastructure that is already in place. Thus, it would be advantageous for a communications system to make use of this existing infrastructure in order to save time and reduce costs of the installation. Thus, many PLCS communicate data via the MV power line and sometimes also via the LV power lines.

As is known to those skilled in the art, numerous MV power lines often extend from a single substation where they are supplied power. Typically, each MV power line is comprised of three phase conductors (e.g., phase A, phase B, and phase C), with each phase conductor carrying a power signal that is phase shifted approximately one hundred twenty degrees from the power signal on the other phase conductors. Typically, the phase conductor of a medium voltage power line will be electrically connected to the corresponding phase of one or more other MV power lines at the substation. For example, the phase A of a numerous MV power lines extending from the substation may be electrically connected to a first bus bar, the phase B conductors are connected to a second bus bar, and the phase C conductors electrically connected to a third bus bar. Consequently, any PLC data signals coupled to any phase conductor at the substation will be transmitted down all of the MV power lines (or at the very least, transmitted down one phase of each three phase power line extending from the substation).

Consequently, it would be desirable to isolate each MV power line so that simultaneous communications can take place separately on each MV power line. The present invention provides one system and method of isolating the MV power lines.

These and other advantages are provided by various embodiments of the present invention.

SUMMARY OF THE INVENTION

The present invention provides communications via multiple power lines that are communicatively coupled to each other at a coupling location, which for example may be at a substation. In one embodiment, the system may comprise a first communications device communicatively coupled to a first MV power line at a first location, wherein the first location is a first distance from the coupling location. A second communications device may be communicatively coupled to a second MV power line at a second location, wherein the second location is a second distance from the coupling location. The devices may be backhaul points, bypass devices, or other PLC network elements. The first communications device transmits data over MV power lines a first communications distance. The locations are selected so that sum of the first distance and the second distance is greater than the first communications distance even if the first distance is less than the first communications distance.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Figure 1:
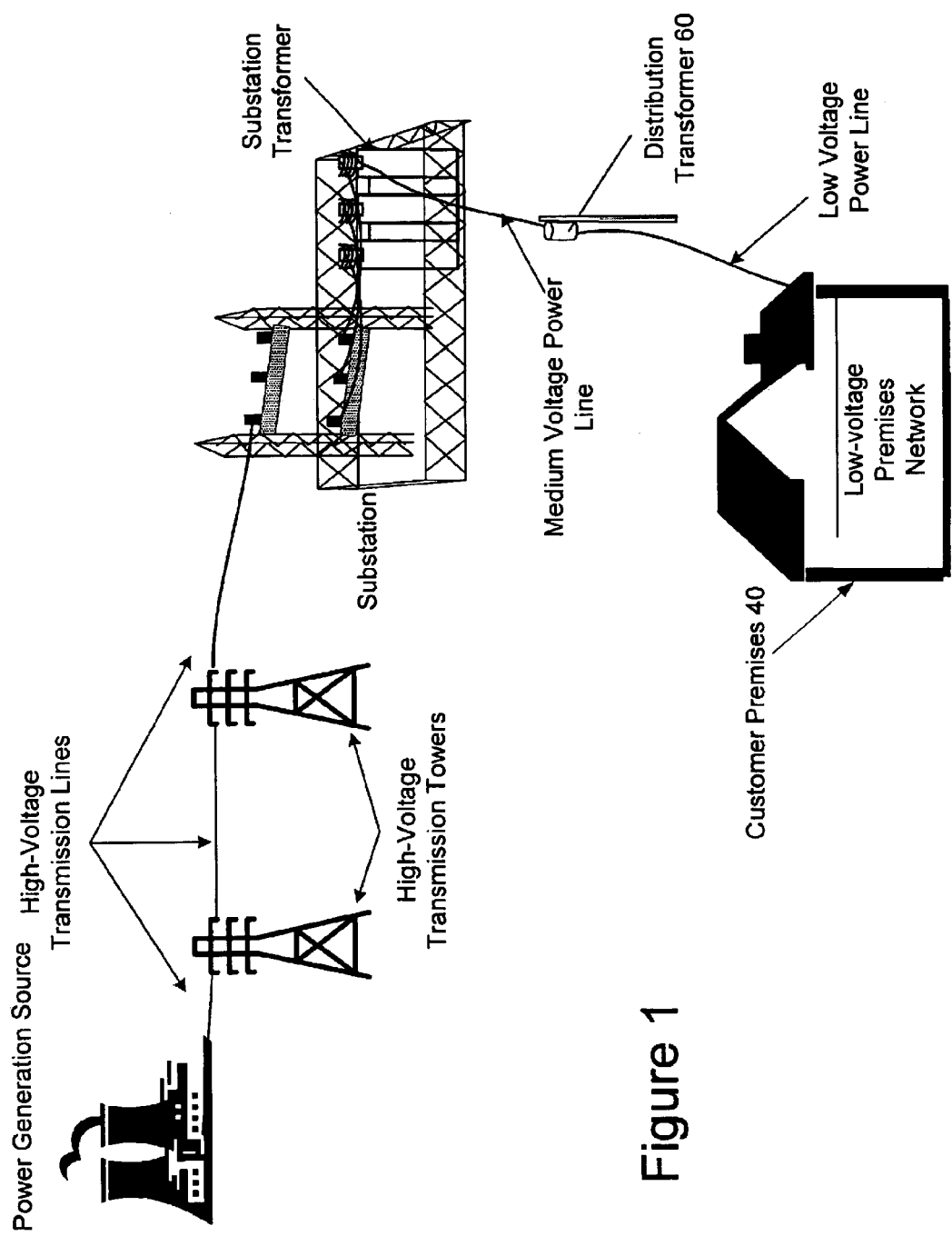
FIG. 1 is a diagram of an exemplary power distribution system with which the present invention may be employed.

As shown in FIG. 1, power distribution systems typically include components for power generation, power transmission, and power delivery. A transmission substation typically is used to increase the voltage from the power generation source to high voltage (HV) levels for long distance transmission on HV transmission lines to a substation. Typical voltages found on HV transmission lines range from 69 kilovolts (kV) to in excess of 800 kV.

In addition to HV transmission lines, power distribution systems include MV power lines and LV power lines. As discussed, MV typically ranges from about 1000 V to about 100 kV and LV typically ranges from about 100 V to about 240 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase currents to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

As discussed, power line communications systems employ a portion of the power distribution to communicate data. Depending on the system, PLCSs may employ both MV power lines and LV power lines, only the MV power lines, or only the LV power lines. They may also use the HV power lines. In one example embodiment, the PLCS employs the MV power lines and the LV power lines. This system is comprised of a backhaul point that is communicatively coupled to the MV power line and to a conventional telecommunications medium such as a fiber optic cable, a coaxial cable, or a wireless link. Thus, the backhaul point interfaces the MV power line to a conventional telecommunications medium. The backhaul point communicates via the MV power line with one or more bypass devices that also are communicatively coupled to the MV power line. The bypass device provides a path for data to bypass the distribution transformer (which may significantly attenuate the data signals). The bypass device receives data from the backhaul point and may transmit that data over the LV power lines to user devices that disposed in the customer premises and that are electrically connected to the LV power lines. Likewise, the bypass device receives data via the LV power lines from user devices and may transmit that data upstream to the backhaul point which communicates the data upstream via the conventional telecommunications medium.

A detailed description of an example PLCS, its components and features is provided in U.S. patent application Ser. No. 10/641,689 filed Aug. 14, 2003, entitled "Power Line Communication System and Method of Operating the Same," which is hereby incorporated by reference in its entirety. In other PLCSs, data may be communicated via the medium voltage power line and then communicated wirelessly to and from the customer location (e.g., using an IEEE 802 protocol). In other examples PLCSs, the data may be transmitted through the distribution transformer to the customer location (e.g., with or without a repeater on the low voltage power line). In another example PLCS, surface waves are communicated on the medium voltage power line instead of, or in addition to, conventional conductive signals. Thus, the invention is not limited to a particular PLCS, PLCS architecture, or topology.

In some embodiments, such as those communicating through overhead MV conductors, data signals may couple across the MV phase conductors. In other words, data signals transmitted on one MV phase conductor (e.g., from a backhaul point) may be present on all of the MV phase conductors due to the cross coupling of the conductors. As a result, the backhaul point may not need to be physically connected to all three phase conductors of the MV cable and transmissions from the backhaul point coupled to one MV phase conductor will be received by the bypass devices connected to the other MV phase conductors and vice versa.

As discussed, the MV power lines typically extend from a substation. Often the utility company will have installed a conventional telecommunications medium to the substation, such as a fiber optic cable. The conventional telecommunications medium present at the substation is often suitable for use as the upstream link for the backhaul point. However, as discussed above, the MV power lines typically are electrically connected at the power substation. Consequently, if more than one backhaul point using any of the same communications frequencies is installed at or very near the substation to interface with the fiber optic cable, their communications will often interfere with each other. Due to the cross phase coupling described above, the interference may occur even if the backhaul points are installed on different phases.

Overview of Example Embodiments

In many PLCSs, the communications devices typically reliably transmit a limited distance. Government regulations relating to emissions limit the power that can be used to transmit the signals. In addition, the power lines, such as the MV power lines, have a characteristic impedance that attenuates the data signals. Due to these two facts and others, the transmissions of the communications devices of many PLCSs only traverse the power lines a finite distance before the power of the signal attenuates to, or substantially to, the noise floor and cannot be received. In addition, the signal will not interfere or interfere only minimally with other communications devices at locations where the signal has been attenuated to low power levels (e.g., near the noise floor).

This distance over which the signals may traverse before becoming attenuated so as not to interfere, or interfere only minimally, with another communications device (hereinafter referred to as "interference distance") may be substantially the same among the communications devices of a particular PLCS for similar power distribution systems or may be different. In other PLCS, the interference distance may be different for each device. The interference distance may be more than, or substantially the same as, the distance over which two devices could communicate and may vary for given device depending the surrounding power distribution system (e.g., number of phase conductors, overhead versus underground, characteristic impedance, number of taps, etc.)

Figure 2:
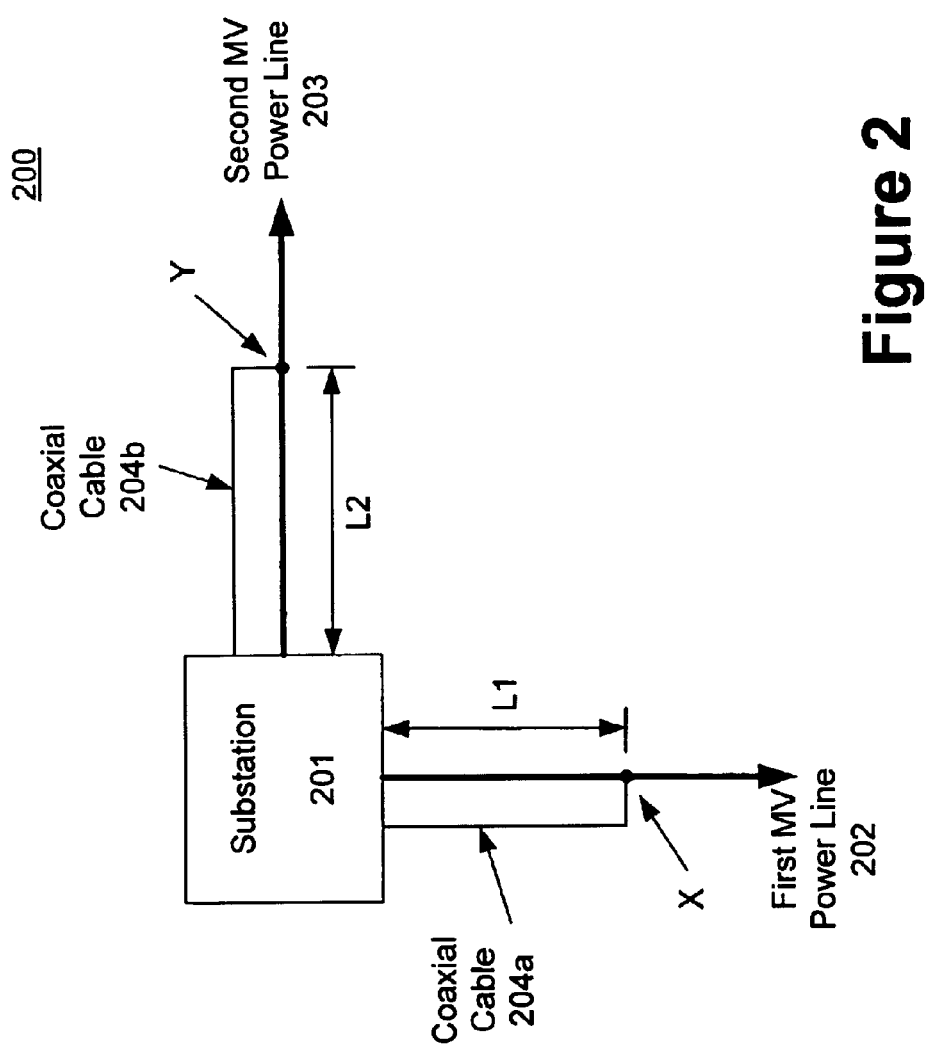
FIG. 2 is a diagram of an example embodiment of a power line communications system, in accordance with the present invention.

FIG. 2 is a schematic representation of an example embodiment of a PLC system 200 employing the present invention. While the figure shows a substation with two MV power lines extending therefrom, in practice the substation may have many more MV power lines. In this example embodiment, the data signals are not coupled to the MV power lines at the substation 201, but instead, are coupled to the power lines a predetermined distance from the substation 201. As shown in FIG. 2, the data signals are coupled onto and off of the first MV power line 202 at point X, which is a distance L1 from the substation 201. Similarly, the data signals are coupled onto and off of the second MV power line 203 at point Y, which is a distance L2 from the substation 201. In this example, the MV power lines are communicatively coupled together at a coupling location that is at the substation.

In this example embodiment, the cumulative distance of L1+L2 is greater than the signal propagation distance over the MV power line so that signals coupled onto the first MV power line at point X do not reach (or are not intelligibly received by and/or do not interfere with communications at) a device (e.g., a backhaul point) at point Y on the second MV power line and vice versa. Thus, by selecting the distances L1 and L2 so that they are cumulatively greater than the maximum communications distance (or interference distance) of the devices at X and Y, the two backhaul points coupled to the MV power lines can be effectively isolated. Such a topology permits communications on the first 202 and second MV power lines 203 simultaneously without interference. As will be evident to those skilled in the art, the present invention permits the backhaul points or other similar situated communications devices to use the same frequency bands.

Because the substation often includes an existing broadband communications medium, such as a fiber optic cable, it may be desirable to communicatively couple the backhaul point at point X and point Y to the communication mediums at the substation 201 via a coaxial cable 204 as shown in FIG. 2. Alternately, the communication links between the substation 201 and the backhaul points might be fiber optic, wired connections (e.g., DSL), wireless links (e.g., 802.11), or other non-power line communications medium.

The present invention may provide communications via a first and a second medium voltage power line that are communicatively coupled to each other at a coupling location, which for example may be at, in, or near a substation, or elsewhere. The coupling may be due to the fact that the MV power lines are electrically connected, due to cross coupling of the signals as a result of the close proximity of the conductors, a combination thereof, and/or some other reason. In one embodiment, the system may comprise a first communications device communicatively coupled to the first MV power line at a first location, wherein the first location is a first distance from the coupling location. A second communications device may be communicatively coupled to the second MV power line at a second location, wherein the second location is a second distance from the coupling location. The devices may be backhaul points, bypass devices, or other PLC network elements. In this example embodiment, the first communications device transmits data over MV power lines a first communications distance, which may be a predetermined distance, an estimated maximum communications distance, the interference distance, a measured maximum communications distance, the signal propagation distance, or other related distance. In this embodiment, the sum of the first distance and the second distance is greater than the first communications distance and the first distance may be less than the first communications distance.

In addition, in this embodiment, the second communications device may transmit data over MV power lines a second communications distance (which may be the same or different from the first communications distance). The sum of the first distance and the second distance is greater than the second communications distance, and the second distance may be less than the second communications distance. The first and second distances may be the same or different distances.

In this embodiment, a non-power line communications interface, which may be a fiber optic, coaxial, T1, or other cable or link (and may include a router), may be disposed proximate the coupling location such as at the substation and a first non-power line communications medium communicatively couples the first communications device to the non-power line communications interface. In this embodiment, a second non-power line communications medium communicatively may couple the second communications device to the non-power line communications interface.

The first communications device may be a first modem in communication with a first transceiver configured to communicate via the first non-power line communications medium and the second communications device may comprise a second modem in communication with a second transceiver configured to communicate via the second non-power line communications medium. The first and second communications devices may further comprises a router in communication with their respective modems.

In this example embodiment, the non-power line communications medium comprises a coaxial cable. There may be customers between the substation 201 and point X and/or between the substation 201 and point Y that wish to subscribe to the PLC service. In one embodiment, such customers are serviced by coupling data signals from the coaxial cable onto the external LV power lines of the customer premises. Examples of systems and communications devices for providing such communications is provided in U.S. patent application Ser. No. 10/884,685 filed Jul. 2, 2004, entitled "Power Line Communication System and Method of Operating the Same," which is hereby incorporated by reference in its entirety.

Alternately, the customers between point X and the substation 201 may be serviced via a transformer bypass device (not shown) that receives data via the MV power line from a backhaul point at point X. Similarly, the customers between point Y and the substation 201 may be serviced via a transformer bypass device (not shown) that receives data via the MV power line from a backhaul point at point Y. However, if the customers are served in this manner, the distances L1 and L2 would each have to be great enough so that the data signals attenuate to a degree that they do not interfere with the devices on the other MV power lines. More particularly, the distances L1 and L2 would have to be measured from all of the PLCS devices. If the signal propagation distance (SPD) of the devices are substantially the same, the distances of L1 and L2 would be measured from the device that is closest to the substation. Examples of systems and communications devices for providing such communications are provided in the applications incorporated herein.

The above described example employs the natural attenuation of the MV power line to prevent data coupled onto the first MV power line at point X from interfering with the device at point Y, and vice versa. Alternately, a data attenuator could be installed between each backhaul point and the substation 201 to shorten the distance L1 or to allow the backhaul points to be installed in the substation.

The present invention may be equally suitable for use with an underground or overhead power distribution system. Similarly, while the above disclosed embodiment employs coaxial cable, other embodiments may use an alternate communications medium such as fiber optics, ultra wide band, twisted pair, DSL, wireless, WiFi, Ethernet, etc.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A communications system for providing communications via a first and second power line that are communicatively coupled to each other at a coupling location, the system comprising:
   a first communications device communicatively coupled to the first MV power line at a first location, wherein the first location is a first distance from the coupling location, and wherein said first communications device transmits data over MV power lines a first communications distance;
   a second communications device communicatively coupled to the second MV power line at a second location, wherein the second location is a second distance from the coupling location;
   wherein the sum of the first distance and the second distance is greater than the first communications distance; and
   wherein the first distance is less than the first communications distance.

2. The system of claim 1, wherein said second communications device transmits data over the power lines a second communications distance, and wherein the sum of the first distance and the second distance is greater than the second communications distance, and wherein the second distance is less than the second communications distance.

3. The system of claim 2, wherein a non-power line communications interface is disposed proximate the coupling location, the system further comprising a first non-power line communications medium communicatively coupling said first communications device to the non-power line communications interface.

4. The system of claim 3, further comprising a second non-power line communications medium communicatively coupling said second communications device to the non-power line communications interface.

5. The system of claim 4, wherein said first communications device comprises a first modem in communication with a first transceiver configured to communicate via the first non-power line communications medium, and wherein said second communications device comprises a second modem in communication with a second transceiver configured to communicate via the second non-power line communications medium.

6. The system of claim 5, wherein said first communications device further comprises a first router in communication with said first modem, and wherein said second communications device further comprises a second router in communication with said second modem.

7. The system of claim 5, wherein said first and second non-power line communications mediums comprise a wireless communication link.

8. The system of claim 5, wherein said first and second non-power line communications mediums each comprises a fiber optic cable.

9. The system of claim 5, wherein said first and second non-power line communications mediums each comprises a coaxial cable.

10. The system of claim 1, wherein a non-power line communications interface is disposed proximate the coupling location, the system further comprising a first non-power line communications medium communicatively coupling said first communications device to the non-power line communications interface.

11. The system of claim 10, wherein said first communications device comprises a modem in communication with a first transceiver configured to communicate via the first non-power line communications medium.

12. The system of claim 11, wherein said first communications device further comprises a router in communication with said modem.

13. The system of claim 10, wherein said first non-power line communications medium comprises a wireless communication link.

14. The system of claim 10, wherein said first non-power line communications medium comprises a fiber optic cable.

15. The system of claim 10, wherein said first non-power line communications medium comprises a coaxial cable.

16. The system of claim 2, wherein the first communications distance is substantially the same as said second communications distance.

17. A method of providing communications via at least two power lines that are communicatively coupled to each other at a coupling location, the system comprising:
   communicatively coupling a first communications device to the first power line at a first location, wherein the first location is a first distance from the coupling location, and wherein the first communications device transmits data over a power line a first communications distance;
   communicatively coupling a second communications device to the second power line at a second location, wherein the second location is a second distance from the coupling location;
   wherein the sum of the first distance and the second distance is greater than the first communications distance; and
   wherein the first distance is less than the first communications distance.

18. The method of claim 17, wherein the second communications device transmits data over a power line a second communications distance and wherein the sum of the first distance and the second distance is greater than the second communications distance, and wherein the second distance is less than the second communications distance.

19. The method of claim 18, wherein a non-power line communications interface is disposed proximate the coupling location, the method further comprising communicatively coupling the first communications device to the non-power line communications interface via a first non-power line communications medium.

20. The method of claim 19, further comprising communicatively coupling the second communications device to the non-power line communications interface via a second non-power line communications medium.

21. The method of claim 17, further comprising communicatively coupling a data signal attenuator to the first power line between the first location and the coupling location.

22. A method of providing communications via a plurality of two voltage power lines that are communicatively coupled to each other at a coupling location, the system comprising:

communicatively coupling a communications device to each of the plurality of power lines at a device location;

wherein each communications device transmits data over a power line a communications distance;

wherein the device location is a distance from the coupling location;

wherein the sum of the distance between the coupling location and the device location of any communications device and the distance between the coupling location and the device location of any other communications device is greater than the communications distance of either of the communications devices; and wherein the distance between the device location of either of the communications device is less than the communications distance of either of the communications devices.

23. The method of claim 22, wherein a non-power line communications interface is disposed proximate the coupling location, the method further comprising communicatively coupling each of the communications devices to the non-power line communications interface via a first non-power line communications medium.

* * * * *